US008723128B2

(12) United States Patent
Takayama

(10) Patent No.: US 8,723,128 B2
(45) Date of Patent: May 13, 2014

(54) NUCLEAR MEDICINE IMAGING APPARATUS AND NUCLEAR MEDICINE IMAGING METHOD

(71) Applicants: Kabushiki Kaisha Toshiba, Minato-ku (JP); Toshiba Medical Systems Corporation, Otawara (JP)

(72) Inventor: Takuzo Takayama, Utsunomiya (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/751,344

(22) Filed: Jan. 28, 2013

(65) Prior Publication Data

US 2013/0134311 A1 May 30, 2013

Related U.S. Application Data

(63) Continuation of application No. PCT/JP2011/067736, filed on Aug. 3, 2011.

(30) Foreign Application Priority Data

Aug. 9, 2010 (JP) ................................ 2010-178564

(51) Int. Cl.
G01T 1/172 (2006.01)
(52) U.S. Cl.
USPC .................................................. 250/363.03
(58) Field of Classification Search
CPC ..................................................... G01T 1/172
USPC .................................................. 250/363.03
See application file for complete search history.

(56) References Cited

U.S. PATENT DOCUMENTS

| 6,903,344 | B2 * | 6/2005 | Breeding et al. .......... 250/363.03 |
| 7,411,199 | B2 * | 8/2008 | Vernon .................... 250/370.08 |
| 2008/0130838 | A1 | 6/2008 | Muehllehner et al. |
| 2009/0179154 | A1 | 7/2009 | Ooi |
| 2009/0224158 | A1 * | 9/2009 | Haselman et al. ........ 250/363.02 |
| 2012/0153166 | A1 * | 6/2012 | Gueorguiev et al. .......... 250/362 |

FOREIGN PATENT DOCUMENTS

| CN | 101111781 A | 1/2008 |
| CN | 101208616 A | 6/2008 |

(Continued)

OTHER PUBLICATIONS

International Search Report mailed Sep. 13, 2011, in PCT/JP2011/067736 filed Aug. 3, 2011 (with English Translation).

Primary Examiner — Constantine Hannaher
(74) Attorney, Agent, or Firm — Oblon, Spivak, McClelland, Maier & Neustadt, L.L.P.

(57) ABSTRACT

In the nuclear medicine imaging apparatus according to the one embodiment, the ADC converts the output data of each of the photodetectors to digital data. The counting information collecting unit collects counting results from the digital data, and the counting information storage unit stores the counting result in association with the digital data. The coincidence counting information generating unit generates coincidence counting information. The image reconstructing unit reconstructs a PET image, based on the coincidence counting information. The time correction data stores a correction time for each of the photodetectors. The system controlling unit controls to correct the detection time of the gamma rays in the digital data associated with each piece of the counting information by use of the correction time, and to generate new coincidence counting information. The system controlling unit controls to reconstruct a new nuclear medicine image, based on the new coincidence counting information generated.

8 Claims, 10 Drawing Sheets

(56) References Cited

FOREIGN PATENT DOCUMENTS

| | | |
|---|---|---|
| JP | 2006-266996 | 10/2006 |
| JP | 2007-107995 | 4/2007 |
| JP | 2007-114219 | 5/2007 |
| JP | 2008-528996 | 7/2008 |
| WO | WO 2007/043137 A1 | 4/2007 |

* cited by examiner

MODULE ID
P: SCINTILLATOR NUMBER
E: ENERGY VALUE
T: DETECTION TIME

FIG.7

| ID | P | E | T | DATA |
|---|---|---|---|---|
|  | P11 | E11 | T11 | P1a-1, ⋯ |
|  | P12 | E12 | T12 | P1b-1, ⋯ |
| D1 | P13 | E13 | T13 | P1d-1, ⋯ |
|  | ⋮ | ⋮ | ⋮ | ⋮ |

| ID | P | E | T | DATA |
|---|---|---|---|---|
|  | P21 | E21 | T21 | P2c-1, ⋯ |
|  | P22 | E22 | T22 | P2b-1, ⋯ |
| D2 | P23 | E23 | T23 | P2d-1, ⋯ |
|  | ⋮ | ⋮ | ⋮ | ⋮ |

| ID | P | E | T | DATA |
|---|---|---|---|---|
|  | P31 | E31 | T31 | P3d-1, ⋯ |
|  | P32 | E32 | T32 | P3a-1, ⋯ |
| D3 | P33 | E33 | T33 | P3b-2, ⋯ |
|  | ⋮ | ⋮ | ⋮ | ⋮ |

| | | | DETECTION TIME MEASURE-MENT CRITERIA | | | | DETECTION TIME MEASURE-MENT CRITERIA |
|---|---|---|---|---|---|---|---|
| P11 | E11 | T11 | DT1+M1 | P22 | E22 | T22 | DT2+M1 |
| P12 | E12 | T12 | DT1+M1 | P32 | E32 | T32 | DT3+M1 |
| P13 | E13 | T13 | DT1+M1 | P33 | E33 | T33 | DT3+M1 |
| ⋮ | ⋮ | ⋮ | ⋮ | ⋮ | ⋮ | ⋮ | ⋮ |

FIG.8B

| | | | | DETECTION TIME MEASURE-MENT CRITERIA | | | | | DETECTION TIME MEASURE-MENT CRITERIA |
|---|---|---|---|---|---|---|---|---|---|
| P11 | E11 | T11 | P1a-1, ⋯ | DT1+M1 | P22 | E22 | T22 | P2b-1, ⋯ | DT2+M1 |
| ⋮ | ⋮ | ⋮ | ⋮ | ⋮ | ⋮ | ⋮ | ⋮ | ⋮ | ⋮ |

| ID | PMTID | CORRECTION TIME |
|---|---|---|
|  | P1a | t1a |
|  | P1b | t1b |
| D1 | P1c | t1c |
|  | ⋮ | ⋮ |

| ID | PMTID | CORRECTION TIME |
|---|---|---|
|  | P2a | t2a |
|  | P2b | t2b |
| D2 | P2c | t2c |
|  | ⋮ | ⋮ |

| ID | PMTID | CORRECTION TIME |
|---|---|---|
|  | P3a | t3a |
|  | P3b | t3b |
| D3 | P3c | t3c |
|  | ⋮ | ⋮ |

FIG.13

| P11 | E11 | T'11 | P22 | E22 | T'22 |
|-----|-----|------|-----|-----|------|
| P12 | E12 | T'12 | P32 | E32 | T'32 |
| P13 | E13 | T'13 | P33 | E33 | T'33 |
| ⋮ | ⋮ | ⋮ | ⋮ | ⋮ | ⋮ |

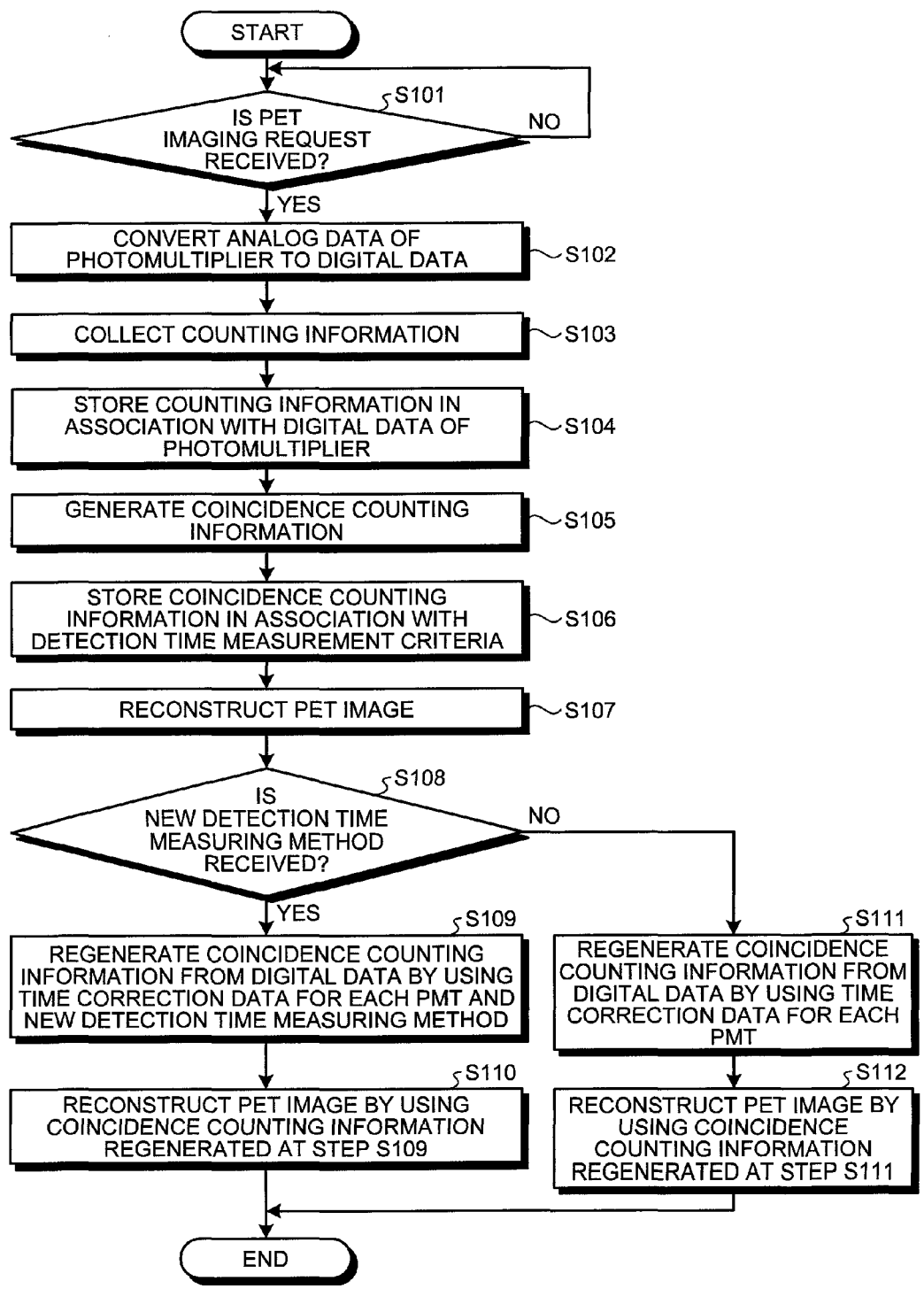

NUCLEAR MEDICINE IMAGING APPARATUS AND NUCLEAR MEDICINE IMAGING METHOD

CROSS-REFERENCE TO RELATED APPLICATIONS

This application is a continuation of PCT international application Ser. No. PCT/JP2011/067736 filed on Aug. 3, 2011 which designates the United States, and which claims the benefit of priority from Japanese Patent Application No. 2010-178564, filed on Aug. 9, 2010; the entire contents of which are incorporated herein by reference.

FIELD

Embodiments described herein relate generally to a nuclear medicine imaging apparatus and a nuclear medicine imaging method.

BACKGROUND

As medical diagnostic imaging equipment that can conduct functional diagnosis on body tissue of a subject, a positron emission computed tomography apparatus (PET apparatus) has been known. Specifically, in a PET exam, a medicinal agent labeled with positron emitting radionuclides is administered to a subject. Then, the PET apparatus detects a pair of 511 keV gamma rays that are emitted in substantially opposite directions when positrons emitted from the medicinal agent are bound to electrons to disappear, and thereby reconstructs an image (PET image) that indicates distribution of the tissue of the subject that has taken the medicinal agent.

More specifically, the PET apparatus performs coincidence counting on a pair of 511 keV gamma rays that are emitted in substantially opposite directions, by use of a detector that is formed of photon-counting detector modules arranged around the subject in the form of a ring. Then, the PET apparatus performs operation processing on the coincidentally counted gamma ray data (coincidence counting information) to reconstruct a PET image.

The conventional PET apparatus, however, can store therein coincidence counting information generated by a coincidence counting circuit of a hardware structure only. In other words, because the conventional PET apparatus discards any output result of detector modules in which coincidence is not found, the apparatus cannot create coincidence counting information by changing coincidence counting parameters such as a time window width and an energy window width.

For this reason, in a conventional PET apparatus, a PET image has to be newly taken if image correction needs to be performed on a PET image at a request from a radiogram interpreter who interprets the PET image.

BRIEF DESCRIPTION OF DRAWINGS

FIG. 7 is a diagram for explaining a counting information storage unit.

FIG. 8A is a diagram (1) for explaining coincidence counting information data.

FIG. 8B is a diagram (2) for explaining coincidence counting information data.

FIG. 13 is a diagram (2) for explaining coincidence counting information generation control performed by the controlling unit.

FIG. 14 is a flowchart for explaining the process performed by the PET apparatus according to the present embodiment.

DETAILED DESCRIPTION

Figure 1:
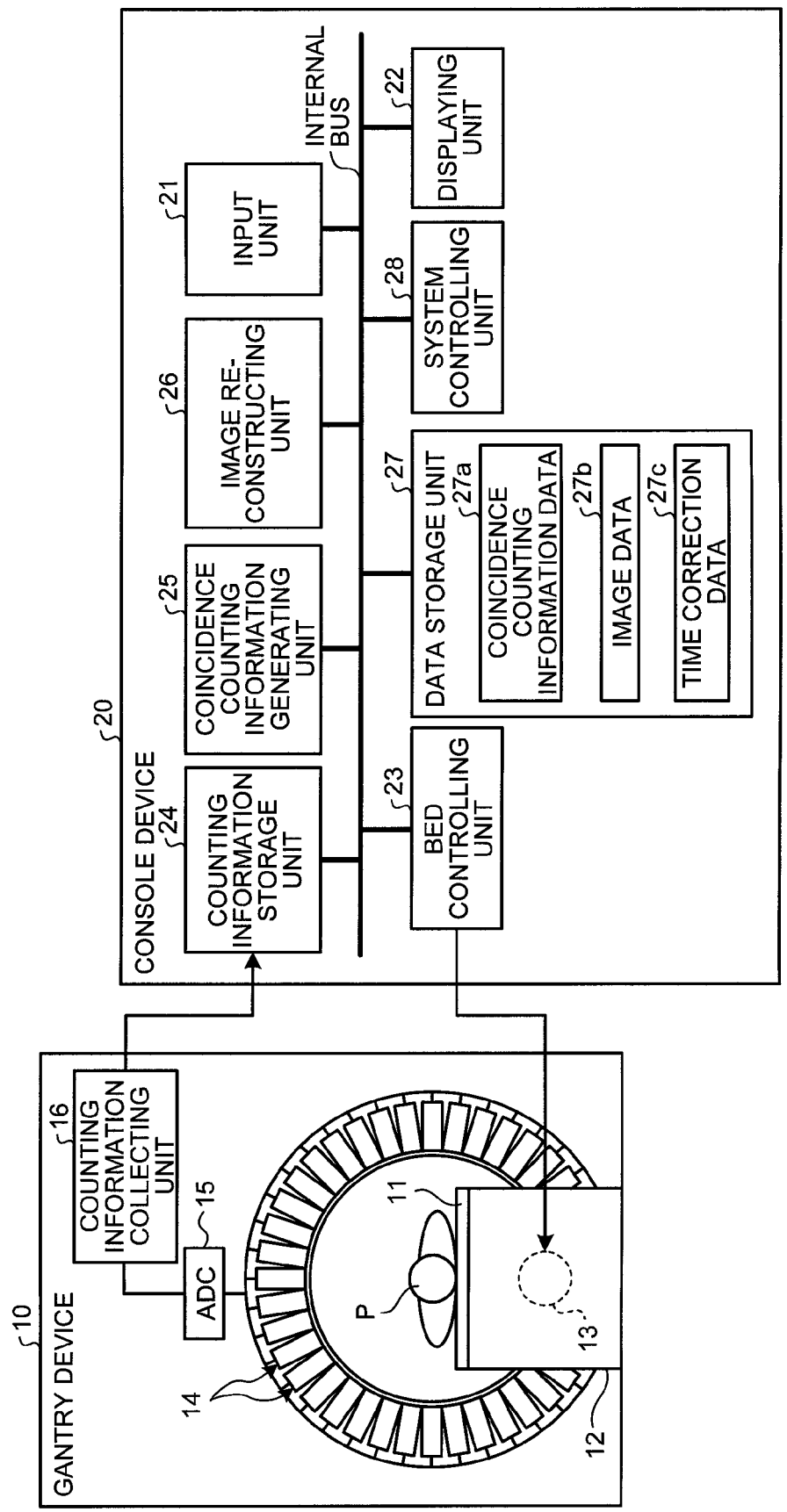
FIG. 1 is a diagram for explaining a configuration of a PET apparatus according to the present embodiment.

According to one embodiment, a nuclear medicine imaging apparatus includes a detector, a converter, a counting information collecting unit, a counting information storage unit, a coincidence counting information generating unit, a coincidence counting information storage unit, an image reconstructing unit, a time correction data storage unit, and a controlling unit. At the detector, a plurality of detector modules are arranged to each include a plurality of photodetectors that output, as analog data, a counting result of light that is derived from gamma rays released from positron emitting radionuclides that are administered to a subject. The converter is configured to convert the analog data output by each of the photodetectors to digital data. The counting information collecting unit is configured to collect, from the digital data output by the converter in accordance with each of the photodetectors, a detection position of the gamma rays on the detector, an energy value of the gamma rays at a time of the gamma rays incident on the detector, and a detection time at which the detector detects the gamma rays, as the counting result of the detector. The counting information storage unit is configured to store therein the counting result collected by the counting information collecting unit in association with digital data that is used for collecting the counting result. The coincidence counting information generating unit is configured to generate coincidence counting information by searching for a combination of counting information in which a pair of gamma rays released from the positron emitting radionuclides are coincidentally counted, based on the energy value and the detection time in the counting information stored in the counting information storage unit. The coincidence counting information storage unit is configured to store the coincidence counting information generated by the coincidence counting information generating unit. Then image reconstructing unit is configured to reconstruct a nuclear medicine image based on the coincidence counting information stored in the coincidence counting information storage unit. The time correction data storage unit is configured to store time correction data for correcting the detection time of the gamma rays in accordance with each of the photodetectors included in the detector. The controlling unit is configured to control the coincidence counting information generating unit to generate new coincidence counting information by correcting the detection time of the gamma rays in digital data associated with each piece of the counting information stored in the counting information storage unit by use of the time correction data stored in the time correction data storage unit, and to control the image reconstructing unit to reconstruct a new nuclear medicine image based on the new coincidence counting information generated by the coincidence counting information generating unit. Embodiments of the nuclear medicine imaging apparatus are explained in detail below with reference to the attached drawings. In the following explanation, a PET (positron emission computed tomography) apparatus is dealt with as the embodiment of the nuclear medicine imaging apparatus.

EMBODIMENTS

The PET apparatus is an apparatus configured to coincidentally count a pair of gamma rays emitted from the tissue that takes in positron emitting radionuclides that are administered to a subject and thereby reconstruct a PET image indicating the distribution of the tissue that takes in positron emitting radionuclides. Then, the PET apparatus according to the present embodiment corrects the PET image without newly taking another image.

The configuration of the PET apparatus according to the present embodiment is explained with reference to FIG. 1 and the like. FIG. 1 is a diagram for explaining the configuration of the PET apparatus according to the present embodiment. As indicated in FIG. 1, the PET apparatus according to the present embodiment includes a gantry device 10 and a console device 20.

The gantry device 10 is a device that counts, for a certain monitoring period, a pair of gamma rays emitted from positron emitting radionuclides that are administered to a subject P and selectively taken into the body tissue of the subject P. It includes a top plate 11, a bed 12, a bed driving unit 13, detector modules 14, an ADC 15, and a counting information collecting unit 16. As illustrated in FIG. 1, the gantry device 10 has a hollow space that serves as an imaging bore.

The top plate 11 is a bed on which the subject P lies, and is placed on the bed 12. The bed driving unit 13 moves the top plate 11 to carry the subject P into the imaging bore of the gantry device 10, under the control of a later-described bed controlling unit 23.

Figure 2:
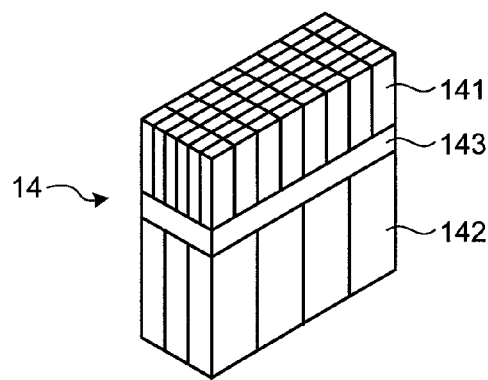
FIG. 2 is a diagram for explaining a detector module.

The detector module 14 is a photon counting detector that detects gamma rays emitted from the subject P. In the gantry device 10, multiple detector modules 14 are arranged in the form of a ring in such a manner as to surround the subject P. Hereinafter, the multiple detector modules 14 may be simply referred to as a detector. The arrangement of the detector modules 14 is not limited to the ring form. For example, the detector may be formed by arranging multiple detector modules 14 in the form of a partial ring. Another example may be that the detector is formed by arranging two sets of flatly aligned detector modules 14 across the subject P. FIG. 2 is a diagram for explaining the detector modules.

More specifically, each detector module 14 is an Anger type detector, which includes scintillators 141, photomultiplier tubes 142 (PMT) that serve as photodetectors, and a light guide 143, as illustrated in FIG. 2.

The scintillators 141 adopt sodium iodide (NaI), bismuth germanate (BGO), lutetium yttrium oxyorthosilicate (LYSO), lutetium oxyorthosilicate (LSO), lutetium gadolinium oxyorthosilicate (LGSO), or the like to convert the incident gamma rays emitted from the subject P to visible light, and are arranged in two dimensions, as shown in FIG. 2. In addition, the photomultiplier tubes 142 form a device that multiplies the visible light output by the scintillators 141 and converts it to an electric signal. Multiple photomultiplier tubes 142 are closely packed with the light guide 143 inserted, as shown in FIG. 2. The light guide 143 is provided to transfer the visible light output by the scintillators 141 to the photomultiplier tubes 142, and is formed of a plastic material having excellent light transmission characteristics, or the like.

A photomultiplier tube 142 includes a photocathode that receives the scintillation light and generates photoelectrons, multistage dynodes that apply an electric field to the generated photoelectrons to accelerate them, and an anode through which the electrons flow out. The electrons released from the photocathode due to the photoelectric effect are accelerated toward the dynodes and collide with the surfaces of the dynodes, and thereby multiple electrons are hammered out. This phenomenon is repeated across the multistage dynodes so that the number of electrons is multiplied like an avalanche and the number of electrons at the anode reaches approximately one million. In such an example, the gain ratio of the photomultiplier tube 142 is one million-fold. Furthermore, the multiplication in accordance with the avalanche effect brings the voltage usually applied between the dynodes and the anode to 600 volts or higher.

As described above, the detector modules 14 converts gamma rays to visible light by use of the scintillators 141, and converts the converted visible light to electric signals by use of the photomultiplier tubes 142, thereby counting the number of gamma rays emitted from the subject P. The photomultiplier tubes 142 output analog data of waveforms that represents the intensity of the electric signals in the form of voltage in chronological order.

Figure 3:
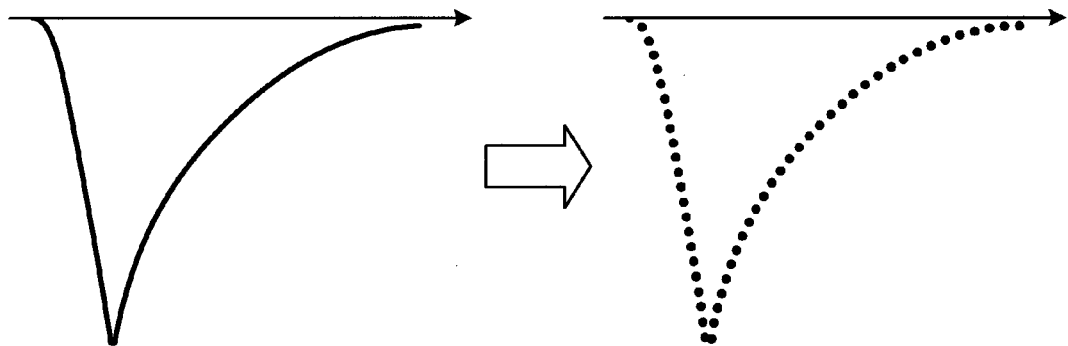
FIG. 3 is a diagram for explaining an ADC.

In FIG. 1, the ADC 15 is an analog/digital convertor, which converts the analog data output by each of the photomultiplier tubes 142 to the digital data. Specifically, the ADC 15 is a digital oscilloscope that can perform high-speed processing, such as an ASC chip. FIG. 3 is a diagram for explaining the ADC.

An example of analog data output by a photomultiplier tube 142 is illustrated in the left diagram of FIG. 3. The ADC 15 samples the analog data at high speed to generate digital data from which the signal waveform of the analog data can be estimated, as indicated in the right diagram of FIG. 3.

In FIG. 1, the counting information collecting unit 16 collects, from the digital data output by the ADC 15 for each photomultiplier tube 142, the gamma ray detection position on the detector, the gamma ray energy value at the gamma ray incident time onto the detector, and the gamma ray detection time detected by the detector, as the counting result of the detector.

Specifically, the counting information collecting unit 16 collects, as counting information that is based on the counting results obtained by the detector modules 14, the gamma ray detection positions on the detector modules 14, the energy values at the gamma ray incident time onto the detector modules 14, and the gamma ray detection times obtained by the detector modules 14.

Figure 4:
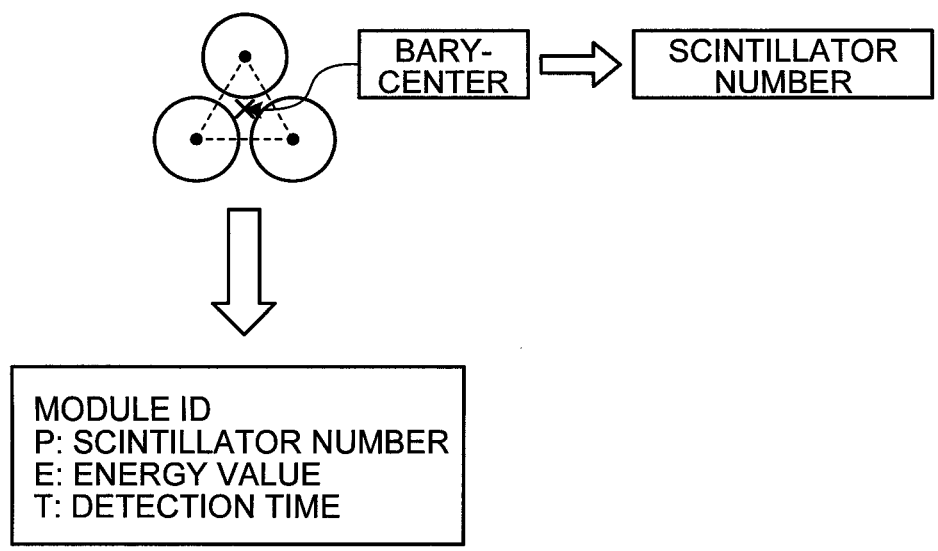
FIG. 4 is a diagram for explaining a counting information collecting unit.

First, the counting information collecting unit 16 performs Anger-type position calculation processing by use of the digital data to collect a detection position from the counting result of a detector module 14. Specifically, the counting information collecting unit 16 calculates, as indicated in FIG. 4, the position of the barycenter from the positions of the photomultiplier tubes 142 that convert the scintillation light of the scintillators 141 to electric signals and output them at the same timing and the energy values of the gamma rays that correspond to the intensities of the electric signals, and thereby obtains the scintillator number (P) that represents the position of the scintillator onto which the gamma rays are incident. When the photomultiplier tubes 142 are position detecting-type photomultiplier tubes, the counting information collecting unit 16 performs the collecting of detection positions at the position detecting-type photomultiplier tubes.

In addition, the counting information collecting unit 16 calculates the height of the waveform that is generated by performing calculation processing (integral and differential processing) onto the digital data of the electric signal output by each of the photomultiplier tubes 142. Then, the counting information collecting unit 16 determines the calculated wave height as the energy value (E) of the gamma rays incident onto a detector module 14.

Moreover, the counting information collecting unit 16 calculates the detection time (T) at which the detector module 14 detects the gamma rays. Here, the detection time (T) may be an absolute time (clock time) or a relative time with respect to the PET imaging start point. In either event, the counting information collecting unit 16 collects the detection time (T) with accuracy of, for example, $10^{-12}$ seconds (picoseconds).

With the above processing, the counting information collecting unit 16 collects, as counting information, "P: scintillator number, E: energy value, and T: detection time" that are brought into association with "module ID" which uniquely identifies each detector module 14, as indicated in FIG. 4.

Figure 5:
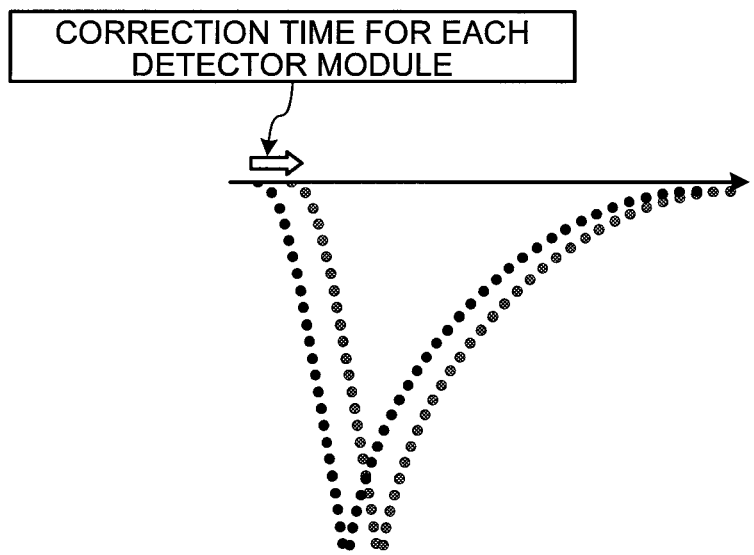
FIG. 5 is a diagram (1) for explaining a detection time measured by the counting information collecting unit.

The measurement of the detection time is explained in detail below with reference to FIGS. 5 and 6. FIGS. 5, 6A, 6B, 6C, and 6D are diagrams for explaining the detection time obtained by the counting information collecting unit. The counting information collecting unit 16 performs time correction of the digital data by use of the corrected time that is measured in advance for each of the detector modules 14. For example, the controller of the PET apparatus calculates the difference between the detection times of the detector modules 14 by use of a point radiation source in which germanium (Ge) is included. For example, the point radiation source is positioned substantially at the center of the detector modules 14 that are arranged in the form of a ring. Then, the counting information collecting unit 16 measures the detection times at which the detector modules 14 detect gamma rays emitted from the point radiation source, by use of the digital data. The counting information collecting unit 16 thereby calculates the difference between the detection times of the detector modules 14.

Thereafter, the counting information collecting unit 16 performs digital data time correction for each of the detector modules 14, based on the measured difference between the detection times, as indicated in FIG. 5. In the example of FIG. 5, time corrections are made to the digital data of a correction-target detector module 14, with which the detection time of the detector module 14 is earlier than the true detection time.

Then, the counting information collecting unit 16 measures the detection time of the gamma rays for the digital data onto which time corrections have been made, by a predetermined detection time measuring method. For example, the counting information collecting unit 16 determines the time point at which the voltage reaches a predetermined threshold (TH) as the detection time (T) of the gamma rays, as illustrated in FIG. EA. In the following explanation, the method adopting a threshold is referred to as "method 1".

Figure 6A:
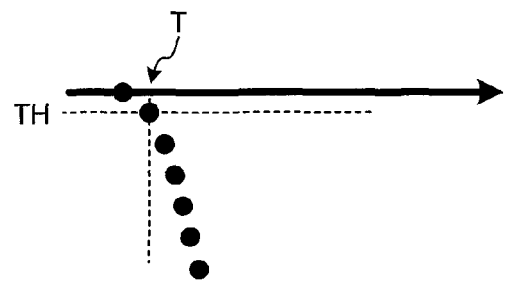
FIG. 6A is a diagram (2) for explaining the detection time measured by the counting information collecting unit.
Figure 6B:
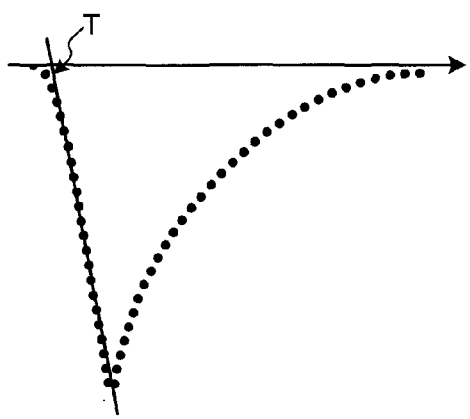
FIG. 6B is a diagram (3) for explaining the detection time measured by the counting information collecting unit.

Alternatively, the counting information collecting unit 16 approximates the rising portion of the plot of the time-corrected digital data by a straight line, as indicated in FIG. 6B.

The slope of the rise of the analog data is reflected to this approximated line. Then, the counting information collecting unit 16 determines the time point at which the approximated curve and the ground (GND) line cross (intersection point) as the detection time (T) of the gamma rays, as indicated in FIG. 6B. In the following explanation, the method adopting the slope is referred to as "method 2".

Figure 6C:
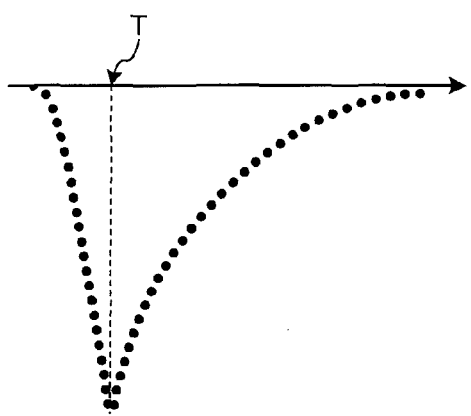
FIG. 6C is a diagram (4) for explaining the detection time measured by the counting information collecting unit.
Figure 6D:
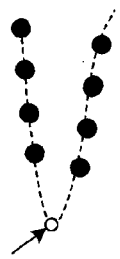
FIG. 6D is a diagram (5) for explaining the detection time measured by the counting information collecting unit.

Still further, the counting information collecting unit 16 may determine the time at which the voltage of the time-corrected digital data reaches its extremal value as the detection time (T) of the gamma rays, as indicated in FIG. 6C. When adopting an extremal, the counting information collecting unit 16 calculates an approximate curve by the method of least squares to obtain the extremal value of the time, as indicated in FIG. 6D. In addition, when adopting a threshold, in a similar manner to the above, the counting information collecting unit 16 calculates an approximate curve from the digital data to measure the detection time of the gamma rays. In the following explanation, the method adopting an extremal is referred to as "method 3".

Here, the analog data may not always form a smooth curve. For this reason, the counting information collecting unit 16 may shape it into a smooth waveform by performing waveform filter processing onto the time-corrected digital data, and then measure the detection time by using any one of the above three methods.

In other words, the detection time measurement criterion that is used for time detection by the counting information collecting unit 16 is determined by a combination of the corrected time for each detector module 14 and the detection time measuring method. The detection time measuring method is determined by choosing which of the above three methods is adopted, whether waveform filter processing is performed in advance, and which type of waveform filter processing is performed in advance. The detection time measuring method adopted by the counting information collecting unit 16 is information preset by the operator on the PET apparatus. With the same detection time measuring method that is determined in this manner, the counting information collecting unit 16 measures the detection time.

Then, the counting information collecting unit 16 sends the collected counting information to the console device 20 (the later-described counting information storage unit 24), together with the digital data that has been used for collecting the counting information. The digital data that is to be sent is data that is output by the ADC 15 before the time correction.

In FIG. 1, the console device 20 is a device that receives operations of the PET apparatus from the operator and reconstructs a PET image from the counting information collected by the gantry device 10.

Specifically, the console device 20 includes, as illustrated in FIG. 1, an input unit 21, a displaying unit 22, a bed controlling unit 23, a counting information storage unit 24, a coincidence counting information generating unit 25, an image reconstructing unit 26, a data storage unit 27, and a system controlling unit 28, and the units of the console device 20 are connected to one another by way of an internal bus.

The input unit 21 includes a mouse, a keyboard, and the like that are used by the operator of the PET apparatus to input various instructions and settings, and transfers the information of the instructions and settings received from the operator to the system controlling unit 28. For example, the input unit 21 receives reconstruction criteria for the reconstruction of a PET image, correction criteria for image correction, and the like from the operator.

The displaying unit 22 is a monitor that the operator consults. It presents a PET image to the operator under the control of the system controlling unit 28 and displays a graphical user interface (GUI) to receive various instructions and settings from the operator by way of the input unit 21.

The bed controlling unit 23 controls the bed driving unit 13 to carry the subject P into the imaging bore of the gantry device 10.

The counting information storage unit 24 stores therein the counting information collected by the counting information collecting unit 16 for each detector module 14, in association with the digital data that has been used for collecting the counting results. FIG. 7 is a diagram for explaining the counting information storage unit.

In the example of FIG. 7, for each "module ID", the counting information is brought into association with the digital data that has been used for collecting the counting information, and stored in the counting information storage unit 24. For example, the counting information storage unit 24 stores therein the counting information of "module ID:D1", "P:P11, E:E11, T:T11", in association with the data "P1a-1, . . . ", which has been used for collecting "P:P11, E:E11, T:T11", as indicated in FIG. 7. Moreover, the counting information storage unit 24 stores therein the counting information of "module ID:D2", "P:P21, E:E21, T:T21", in association with the data "P2c-1, . . . " used for collecting "P:P21, E:E21, T:T21", as indicated in FIG. 7. In this diagram, "P", "E" and "T" represent "scintillator number", "energy value" and "detection time", respectively. Further, "P1a-1", for example, denotes data of the gamma rays that is measured by the photomultiplier tube 142 of "ID:1a" in the detector module 14 of "module ID:D1" for the "first" time.

Moreover, in the same manner as above, the counting information storage unit 24 stores therein the counting information and the digital data used for collecting this counting information in association with each other for the detector modules 14 of "module ID:D3" and the like, as indicated in FIG. 7.

In FIG. 1, the coincidence counting information generating unit 25 searches for a combination of the counting information in which a pair of gamma rays released from the positron emitting radionuclides are coincidentally counted, based on the energy value and the detection time of the counting information stored in the counting information storage unit 24, and thereby generates coincidence counting information that determines the incident directions of the pair of gamma rays emitted from the positrons.

Specifically, the coincidence counting information generating unit 25 generates the coincidence counting information in accordance with coincidence counting information generation criteria included in the reconstruction criteria input by the operator by way of the input unit 21. Here, a time window width and an energy window width are designated as the coincidence counting information generation criteria. For example, the coincidence counting information generating unit 25 generates the coincidence counting information, based on "time window width: 600 picoseconds, energy window width: 350 to 550 kilo electron volts" designated by the operator as the coincidence counting information generation criteria.

In other words, the coincidence counting information generating unit 25 searches for a combination of the counting information of modules in which the difference between the detection times is within "time window width: 600 picoseconds" and the energy values are both in "energy window width: 350 to 550 kilo electron volts", by referring to the "detection time (T)" and the "energy value (E)" for each "module ID" indicated in FIG. 7. In this manner, the coincidence counting information generating unit 25 generates the coincidence counting information.

Then, the coincidence counting information generating unit 25 stores the generated coincidence counting information in the data storage unit 27 illustrated in FIG. 1. Specifically, the coincidence counting information generating unit 25 stores the generated coincidence counting information together with the detection time measurement criteria into a coincidence counting information data 27a in the data storage unit 27 of FIG. 1. Here, the detection time measurement criteria is, as described above, a combination of a correction time and a detection time measuring method for each detector module 14. In other words, the coincidence counting information data 27a further includes the coincidence counting information in association with the detection time measuring method that is used in the measurement of the gamma ray detection time from the digital data that is associated with the counting information used in the combination of the coincidence counting information. FIGS. 8A and 8B are diagrams for explaining the coincidence counting information data.

For example, the coincidence counting information data 27a includes a combination of "P:P11, E:E11, T:T11" and "P22, E:E22, T:T22" as the coincidence counting information that is information of two coincidentally counted annihilation photons, as indicated in FIG. 8A. Then, the coincidence counting information data 27a also stores the detection time measuring criteria "DT1+M1" that is used when measuring the gamma ray detection time from the digital data associated with the counting information "P:P11, E:E11, T:T11", as indicated in FIG. 8A. Furthermore, the coincidence counting information data 27a includes the detection time measurement criteria "DT2+M1" used for measuring the gamma ray detection time from the digital data associated with the counting information "P22, E:E22, T:T22", as indicated in FIG. 8A. Here, "DT1" is the correction time of the detector module 14 of "ID:1", and "M1" is data that indicates the content of the detection time measuring method. For example, "M1" is the detection time measuring method based on method 1 that does not incorporate waveform filter processing.

The coincidence counting information generating unit 25 may store digital data of the photomultiplier tube 142 that is associated with the counting information used in the combination of the coincidence counting information, together with the coincidence counting information and the detection time measurement criteria, into the coincidence counting information data 27a. As a result, the coincidence counting information data 27a includes, for example, the coincidence counting information of "P:P11, E:E11, T:T11" and "P22, E:E22, T:T22", as indicated in FIG. 8B. In other words, the coincidence counting information data 27a includes the counting information "P:P11, E:E11, T:T11" and the detection time measuring method "DT1+M1" in association with the digital data "P1a-1, . . . ", as indicated in FIG. 8B. In addition, the coincidence counting information data 27a includes the counting information "P22, E:E22, T:T22" and the detection time measuring method "DT1+M1" in association with the digital data "P2b-1, . . . ", as indicated in FIG. 8B.

In FIG. 1, the image reconstructing unit 26 reads the coincidence counting information generated by the coincidence counting information generating unit 25 as projection data from the coincidence counting information data 27a, and reconstructs a PET image by using, for example, successive approximation for the read-out projection data. Alternatively, the image reconstructing unit 26 uses the difference between the detection times of the coincidence counting information to reconstruct the PET image. Then, the image reconstructing unit 26 enters the reconstructed PET image into an image data 27b of the data storage unit 27.

The system controlling unit 28 controls the operations of the gantry device 10 and the console device 20 to control the entire PET apparatus. Specifically, the system controlling unit 28 controls the movement of the bed 12 and the counting information collecting process performed by the counting information collecting unit 16. In addition, the system controlling unit 28 controls the coincidence counting information generating process performed by the coincidence counting information generating unit 25 and the PET image reconstructing process performed by the image reconstructing unit 26, based on the setting information input by the operator by way of the input unit 21. Moreover, the system controlling unit 28 conducts control to display the PET image included in the image data 27b on the displaying unit 22.

Then, the system controlling unit 28 controls the coincidence counting information generating unit 25 and the image reconstructing unit 26, by use of time correction data 27c illustrated in FIG. 1.

Figure 9:
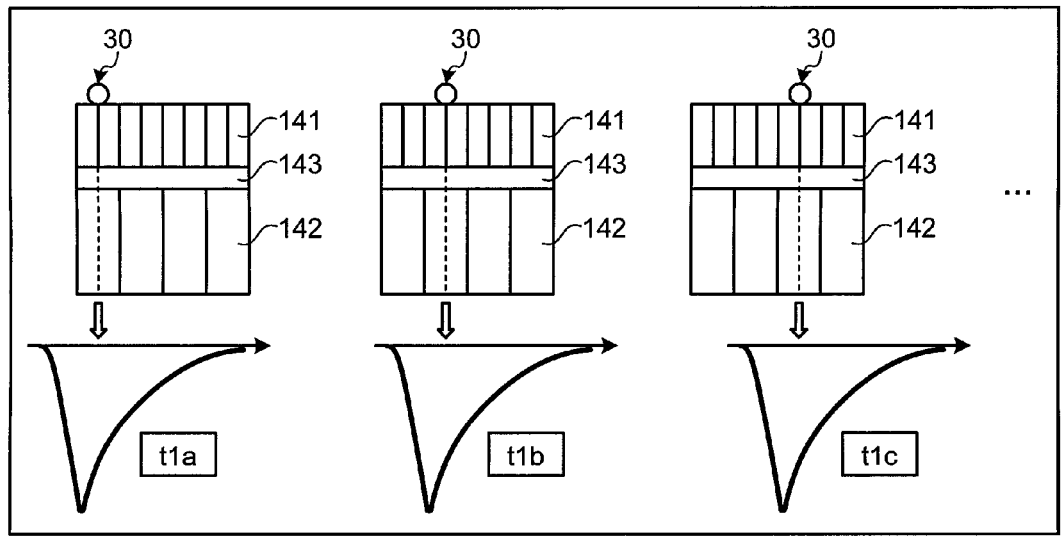
FIG. 9 is a diagram for explaining the first measuring method for correction time of a photomultiplier tube.

The time correction data 27c stores correction time to correct the gamma ray detection time for each of the photomultiplier tubes 142 of the detector. In other words, the time correction data 27c stores the result of measuring the correction time of each photomultiplier tube 142, as the data for more accurately conducting the time correction on the detector module 14. Specific examples of methods of measuring the correction time for each photomultiplier tube 142 are explained with reference to FIGS. 9 and 10. FIG. 9 is a diagram for explaining the first method of measuring the correction time for a photomultiplier tube, and FIG. 10 is a diagram for explaining the second method of measuring the correction time for a photomultiplier tube.

With the first measuring method, a point radiation source 30 is positioned in the vicinity of the scintillator 141 arranged on the central axis of the measurement-target photomultiplier tube 142, as illustrated in FIG. 9. Then, with the first measuring method, a difference between the absolute time at which the point radiation source 30 is placed and the absolute time at which the measurement-target photomultiplier tube 142 outputs the detection result of the gamma rays emitted from the point radiation source 30 is measured. Such measurement is performed on all the photomultiplier tubes 142.

As a result, the correction time of the photomultiplier tube 142 of "PMTID:1a" included in the detector module 14 of "ID:1" is measured as "t1a", as indicated in FIG. 9, for example. In the same manner, the correction time of the photomultiplier tube 142 of "PMTID:1b" included in the detector module 14 of "ID:1" is measured as "t1b". In the same manner, the correction time of the photomultiplier tube 142 of "PMTID:1c" included in the detector module 14 of "ID:1" is measured as "t1c".

Figure 10:
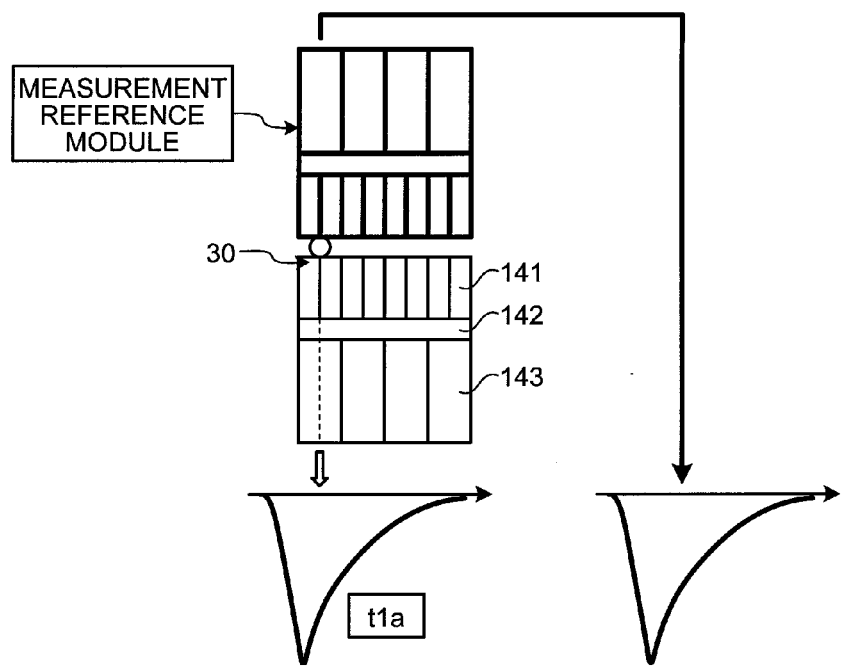
FIG. 10 is a diagram for explaining the second measuring method for correction time of a photomultiplier tube.

With the second measuring method, in a similar manner to the first measuring method, the point radiation source 30 is positioned in the vicinity of the scintillator 141 arranged on the central axis of the measurement-target photomultiplier tube 142, as indicated in FIG. 10. Furthermore, the measurement reference module is arranged in such a manner as to sandwich the point radiation source. Here, the measurement reference module is a detector module 14 in which the output times of the photomultiplier tubes are adjusted to produce an error of approximately "0". Then, the output time of the photomultiplier tube of the measurement reference module that is opposed to the measurement-target photomultiplier tube 142 is measured. In addition, the output time of the measurement-target photomultiplier tube 142 is measured. Then, the difference of the measured output times is measured as the correction time "t1a" of the measurement-target photomultiplier tube 142, as indicated in FIG. 10, for example.

Figures 11, 12:
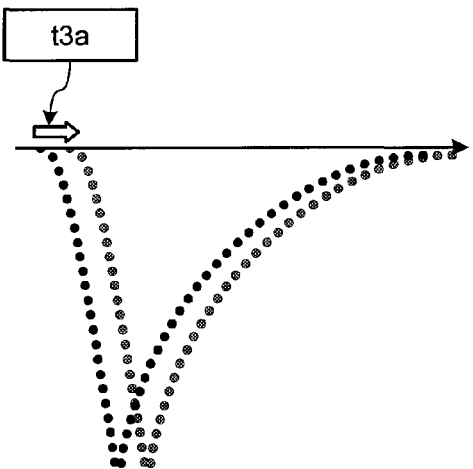
FIG. 11 is a diagram for explaining the time correction data.
FIG. 12 is a diagram (1) for explaining coincidence counting information generation control performed by a controlling unit.

Thereafter, the time correction data 27c stores the results of the aforementioned first and second measuring methods. FIG. 11 is a diagram for explaining the time correction data. In the example of FIG. 11, "t1a" is entered into the time correction data 27c as the correction time of the photomultiplier tube 142 of "PMTID:P1a" in the detector module 14 of "ID:1", for example. Furthermore, in the example of FIG. 11, "t2a" is entered into the time correction data 27c as the correction time of the photomultiplier tube 142 of "PMTID:P2a" in the detector module 14 of "ID:2". Still further, in the example of FIG. 11, "t3a" is entered into the time correction data 27c as the correction time of the photomultiplier tube 142 of "PMTID:P3a" in for the detector module 14 of "ID:3".

Then, the system controlling unit 28 shown in FIG. 1 controls the coincidence counting information generating unit 25 in such a manner as to generate new coincidence counting information by correcting the gamma ray detection time in the digital data that is associated with each piece of counting information stored in the counting information storage unit 24 by use of the time correction data stored in the time correction data 27c. FIGS. 12 and 13 are diagrams for explaining the coincidence counting information generation control performed by the controlling unit.

For example, the coincidence counting information generating unit 25 performs time correction based on "t3a" onto the digital data that is derived from the analog data output from "PMTID:P3a" under the control of the system controlling unit 28, as indicated in FIG. 12. The coincidence counting information generating unit 25 executes this processing onto all the digital data that is associated with each piece of counting information stored in the counting information storage unit 24.

Thereafter, the coincidence counting information generating unit 25 re-measures the detection time of the counting information from the digital data that has been time-corrected for each photomultiplier tube in accordance with the detection time measuring method executed by the counting information collecting unit 16, under the control of the system controlling unit 28. Then, the coincidence counting information generating unit 25 generates new coincidence counting information by use of the re-measured detection time under the control of the system controlling unit 28. For example, as indicated in FIG. 13, the coincidence counting information generating unit 25 generates coincidence counting information by combining "P:P11, E:E11, T:T'11" and "P22, E:E22, T:T'22", and also generates coincidence counting information by combining "P:P12, E:E12, T:T'12" and "P32, E:E32, T:T'32".

Then, the system controlling unit 28 controls the image reconstructing unit 26 to reconstruct a new PET image, based on the new coincidence counting information generated by the coincidence counting information generating unit 25. The image reconstructing unit 26 stores the newly generated PET image into the image data 27c.

In addition, if a new detection time measuring method that is different from the detection time measuring method stored in the coincidence counting information data 27a is received, the system controlling unit 28 performs the following process. The system controlling unit 28 performs the following process, for example, when the detection time measuring method "M1" should be changed to perform on the digital data subjected to a waveform filter process of a certain type, when the threshold of "M1" should be changed, when "M1" should be changed to the detection time measuring method "M2" adopting the method 2, or the like. The system controlling unit 28 is notified of the new detection time measuring method by the inputting process performed by the operator by way of the input unit 21.

In other words, the system controlling unit 28 controls the coincidence counting information generating unit 25 to generate new coincidence counting information by re-measuring the gamma ray detection time from the digital data that is associated with each piece of counting information stored in the counting information storage unit 24 by use of the time correction data stored in the time correction data 27c for each photomultiplier tube 142 and a new detection time measuring method.

Under the control of the system controlling unit 28, the PET image reconstructed based on the counting information collected by the counting information collecting unit 16 and the newly reconstructed PET image may both be displayed on the displaying unit 22, or the newly reconstructed PET image only may be displayed on the displaying unit 22.

Furthermore, the coincidence counting information data 27a stores the newly generated coincidence counting information, the correction time used for the correction of the digital data, and the new detection time measuring method, in association with one another. The coincidence counting information data 27a may further store the digital data of the photomultiplier tube 142 associated with the counting information that is adopted for the combination for the coincidence counting information, in addition to the newly generated coincidence counting information, the correction time used for the correction of the digital data, and the new detection time measuring method, in association with one another.

Next, the procedure of the process performed by the PET apparatus according to the present embodiment is explained with reference to FIG. 14. FIG. 14 is a flowchart for explaining the process performed by the PET apparatus according to the present embodiment.

As indicated in FIG. 14, the PET apparatus according to the first embodiment determines whether an imaging request of a PET image is received by way of the input unit 21 (step S101). Here, when an imaging request of a PET image is not received (no at step S101), the PET apparatus is in a standby state. On the other hand, when an imaging request of a PET image is received (yes at step S101), the detector detects gamma rays emitted from the subject P. Then, the multiple photomultiplier tubes 142 output analog data of a waveform that represents the intensity of an electric signal in voltage value in time sequence.

Then, the ADC 15 converts the analog data of the photomultiplier tubes 142 to the digital data (step S102), and the counting information collecting unit 16 collects the counting information (step S103).

Thereafter, the counting information collecting unit 16 stores the collected counting information in association with the digital data of the photomultiplier tubes 142 into the counting information storage unit 24 (step S104), and the coincidence counting information generating unit 25 generates the coincidence counting information from the counting information stored in the counting information storage unit 24 (step S105).

Next, the coincidence counting information generating unit 25 stores the generated coincidence counting information into the coincidence counting data 27a in association with the detection time measurement criteria (step S106), and the image reconstructing unit 26 reconstructs a PET image from the coincidence counting information stored in the coincidence counting data 27a (step S107).

Then, the system controlling unit 28 determines whether a new detection time measuring method is received from the operator by way of the input unit 21 (step S108).

Here, when a new detection time measuring method is received (yes at step S108), the coincidence counting information generating unit 25 regenerates coincidence counting information from the digital data associated with the counting information by use of the time correction data for each PMT (photomultiplier tube 142) and the new detection time measuring method, under the control of the system controlling unit 28 (step S109). Then, the image reconstructing unit 26 reconstructs a PET image by use of the coincidence counting information regenerated at step S109 under the control of the system controlling unit 28 (step S110), and the process is terminated.

On the other hand, when a new detection time measuring method is not received (no at step S108), the coincidence counting information generating unit 25 regenerates coincidence counting information from the digital data associated with the counting information by use of the time correction data for each PMT (photomultiplier tube 142) under the control of the system controlling unit 28 (step S111). Then, the image reconstructing unit 26 reconstructs a PET image by use of the coincidence counting information regenerated at step S111 under the control of the system controlling unit 28 (step S112), and the process is terminated.

As described above, according to the present embodiment, the detector is configured with multiple detector modules 14 arranged in a form of a ring, where each of the detector modules 14 includes multiple photomultiplier tubes 142 that output as analog data the counting result of light derived from gamma rays that are emitted from positron emitting radionuclides administered to the subject P. The ADC 15 converts the analog data output by each photomultiplier tube 142 to digital data.

Then, the counting information collecting unit 16 collects, from the digital data output by the ADC 15 for each photomultiplier tube 142, the gamma ray detection position on the detector, the gamma ray energy value at the incident time of the gamma rays onto the detector, and the detection time at which the detector detects the gamma rays, as the counting results of the detector. The counting information storage unit 24 stores therein the counting results collected by the counting information collecting unit 16, in association with the digital data that is used for collecting the counting results.

Then, the coincidence counting information generating unit 25 generates coincidence counting information by searching, based on the energy values and the detection times of the counting information stored in the counting information storage unit 24, for a combination of the counting information in which a pair of gamma rays released from the positron emitting radionuclides are coincidentally counted. The coincidence counting information data 27a stores the coincidence counting information generated by the coincidence counting information generating unit 25. The image reconstructing unit 26 reconstructs a nuclear medicine image (PET image), based on the coincidence counting information included in the coincidence counting information data 27a.

The time correction data 27c stores time correction data to correct the detection time of the gamma rays for each photomultiplier tube 142 of the detector. The system controlling unit 28 controls the coincidence counting information generating unit 25 so as to correct the detection time of the gamma rays from the digital data associated with each piece of counting information stored in the counting information storage unit 24 by use of the time correction data and thereby generate new coincidence counting information. Then, the system controlling unit 28 controls the image reconstructing unit 26 to reconstruct a new nuclear medicine image (PET image) based on the new coincidence counting information generated by the coincidence counting information generating unit 25.

Conventional PET apparatus can store therein only coincidence counting information that is generated by a coincidence counting circuit of a hardware structure in the gantry device 10. In contrast, in the PET apparatus according to the present embodiment, the counting information obtained by all the detector modules 14 can be stored inside the console device 20, and the coincidence counting information can be generated inside the console device 20 by a software program, for example. In other words, according to the first embodiment, if the operator desires to observe a PET image that is reconstructed in accordance with different coincidence counting information generation criteria, the coincidence counting information generating unit 25 can immediately generate coincidence counting information, based on the new coincidence counting information generation criteria.

In addition, recently, a time of flight (TOF) PET apparatus that can accurately specify the gamma ray emission position by using a difference between the detection times of a pair of annihilation gamma rays has been developed. However, the time window width required for a TOF-PET is of the order of several hundreds of picoseconds. Because in a conventional PET apparatus, the speed of signal transmission from a detector module 14 to the coincidence counting circuit cannot exceed the speed of light, it has been difficult to reconstruct a PET image on the TOF-PET.

According to the present embodiment, however, the PET apparatus generates coincidence counting information inside the console device 20 from the counting information in which the detection times are collected with precision to picoseconds, and thus a PET image can be reconstructed on a TOF-PET.

Furthermore, according to the present embodiment, the analog data output by the photomultiplier tubes 142 is stored inside the console device 20 as digital data, and thus the output time of each piece of digital data can be corrected inside the console device 20, by use of the correction time for each of the photomultiplier tubes 142. In other words, with the counting information only, changes can be made only to the time window width and the energy window width, but according to the present embodiment, the coincidence counting information in which the difference between the detection times is re-measured with high accuracy can be regenerated by storing the digital data together with the counting information and further storing the correction time for each photomultiplier tube 142. This means that, according to the present embodiment, a PET image can be reconstructed on a TOF-PET by using, for example, the difference between the detection times shorter than 400 picoseconds.

In this manner, according to the present embodiment, without newly performing imaging, a high-quality nuclear medicine image can be reconstructed.

In addition, according to the present embodiment, the coincidence counting information data 27a further stores the coincidence counting information generated by the coincidence counting information generating unit 25, in association with the detection time measuring method that is used for measuring the gamma ray detection time from the digital data associated with the counting information incorporated in the combination for the coincidence counting information. Then, when receiving a new detection time measuring method that is different from the detection time measuring method stored in the coincidence counting information generating unit 25, the system controlling unit 28 controls the coincidence counting information generating unit 25 to generate new coincidence counting information by re-measuring the detection time of the gamma rays from the digital data associated with each piece of counting information, by using the time correction data and the new detection time measuring method. Hence, according to the present embodiment, without newly performing imaging, a nuclear medicine image can be reconstructed with a changed detection time measuring method. The above embodiment has been explained, assuming that the detector module 14 includes multiple photomultiplier tubes 142 as a photodetector. However, the above embodiment may be applied to a case where the detector module 14 includes a photodetector using a semiconductor device instead of the photomultiplier tubes 142. An example of such a photodetector is a silicon photomultiplier (SiPM) using, as a semiconductor device array, avalanche photodiodes (APD).

As explained above, according to the present embodiment, a PET image can be corrected without newly performing imaging.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nuclear medicine imaging apparatus, comprising:
   a detector in which a plurality of detector modules are arranged to each include a plurality of photodetectors that output, as analog data, a counting result of light that is derived from gamma rays released from positron emitting radionuclides that are administered to a subject;
   a converter configured to convert the analog data output by each of the photodetectors to digital data;
   a counting information collecting unit configured to collect, from the digital data output by the converter in accordance with each of the photodetectors, a detection position of the gamma rays on the detector, an energy value of the gamma rays at a time of the gamma rays incident on the detector, and a detection time at which the detector detects the gamma rays, as the counting result of the detector;
   a counting information storage unit configured to store therein the counting result collected by the counting information collecting unit in association with digital data that is used for collecting the counting result;
   a coincidence counting information generating unit configured to generate coincidence counting information by searching for a combination of counting information in which a pair of gamma rays released from the positron emitting radionuclides are coincidentally counted, based on the energy value and the detection time in the counting information stored in the counting information storage unit;
   a coincidence counting information storage unit configured to store the coincidence counting information generated by the coincidence counting information generating unit;
   an image reconstructing unit configured to reconstruct a nuclear medicine image based on the coincidence counting information stored in the coincidence counting information storage unit;

a time correction data storage unit configured to store time correction data for correcting the detection time of the gamma rays in accordance with each of the photodetectors included in the detector; and a controlling unit configured to control the coincidence counting information generating unit to generate new coincidence counting information by correcting the detection time of the gamma rays in digital data associated with each piece of the counting information stored in the counting information storage unit by use of the time correction data stored in the time correction data storage unit, and to control the image reconstructing unit to reconstruct a new nuclear medicine image based on the new coincidence counting information generated by the coincidence counting information generating unit.

2. The nuclear medicine imaging apparatus according to claim 1, wherein:

the coincidence counting information storage unit further stores therein the coincidence counting information generated by the coincidence counting information generating unit in association with a detection time measurement criterion that is used when measuring the detection time of the gamma rays from the digital data associated with the counting information incorporated in the combination for the coincidence counting information; and the controlling unit controls the coincidence counting information generating unit to generate the new coincidence counting information, when a new detection time measurement criterion different from the detection time measurement criterion stored in the coincidence counting information storage unit is received, by correcting the detection time of the gamma rays in the digital data associated with the counting information stored in the counting information storage unit by use of the time correction data stored in the time correction data storage unit and the new detection time measurement criterion.

3. The nuclear medicine imaging apparatus according to claim 1, wherein the counting information collecting unit uses a method of measuring, as the detection time of the gamma rays, a time point at which an output value of the digital data or an output value of the digital data subjected to a waveform filtering process reaches a predetermined threshold.

4. The nuclear medicine imaging apparatus according to claim 3, wherein the counting information collecting unit adopts, as a comparison target with the predetermined threshold, an output value of an approximate curve obtained by approximating the digital data or an output value of an approximate curve obtained by approximating the digital data subjected to the waveform filtering process.

5. The nuclear medicine imaging apparatus according to claim 1, wherein the counting information collecting unit uses a method of measuring, as the detection time of the gamma rays, a time point at which an approximate line obtained by approximating a slope of a rising edge of the digital data crosses a reference line or a time point at which an approximate line obtained by approximating a slope of a rising edge of the digital data subjected to a waveform filtering process crosses the reference line.

6. The nuclear medicine imaging apparatus according to claim 1, wherein the counting information collecting unit uses a method of measuring, as the detection time of the gamma rays, a time point at which an output value of the digital data reaches an extremal value or a time point at which an output value of the digital data subjected to a waveform filtering process reaches an extremal value.

7. The nuclear medicine imaging apparatus according to claim 6, wherein the counting information collecting unit measures the time point of reaching the extremal value by using an approximate curve obtained by approximating the digital data or an approximate curve obtained by approximating the digital data subjected to the waveform filtering process.

8. A nuclear medicine imaging method, comprising:

at a detector in which a plurality of detector modules that detect gamma rays released from positron emitting radionuclides administered to a subject are arranged, outputting a counting result of light derived from the gamma rays as analog data, by each of a plurality of photodetectors included in the detector modules;

converting the analog data output from each of the photodetectors to digital data, by a converter;

collecting a detection position of the gamma rays on the detector, an energy value of the gamma rays at a time point of the gamma rays incident onto the detector, and a detection time at which the detector detects the gamma rays, from the digital data output by the converter in accordance with each of the photodetectors, as the counting result of the detector, and storing the counting result that is collected in association with the digital data that is used for collecting the counting result in the counting information storage unit, by a counting information collecting unit;

generating coincidence counting information by searching for a combination of counting information in which a pair of gamma rays released from the positron emitting radionuclides are coincidentally counted, based on energy values and detection times in the counting information stored in the counting information storage unit, and storing the coincidence counting information that is generated in the coincidence counting information storage unit, by a coincidence counting information generating unit;

reconstructing a nuclear medicine image based on the coincidence counting information stored in the coincidence counting information storage unit, by an image reconstructing unit,; and controlling the coincidence counting information generating unit to generate new coincidence counting information by correcting the detection time of the gamma rays in the digital data associated with each piece of the counting information stored in the counting information storage unit by use of time correction data stored in a time correction data storage unit for correcting the detection time of the gamma rays for each of the photodetectors included in the detector, and controlling the image reconstructing unit to reconstruct a new nuclear medicine image, based on the new coincidence counting information generated by the coincidence counting information generating unit, by a controlling unit.

* * * * *